United States Patent
Huth et al.

(10) Patent No.: US 10,111,091 B2
(45) Date of Patent: Oct. 23, 2018

(54) METHOD FOR GENERATING A SECRET SEQUENCE OF VALUES IN A DEVICE AS A FUNCTION OF MEASURED PHYSICAL PROPERTIES OF A TRANSMISSION CHANNEL

(71) Applicant: Robert Bosch GmbH, Stuttgart (DE)

(72) Inventors: Christopher Huth, Leonberg (DE); Rene Guillaume, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 22 days.

(21) Appl. No.: 15/378,873

(22) Filed: Dec. 14, 2016

(65) Prior Publication Data

US 2017/0171749 A1   Jun. 15, 2017

(30) Foreign Application Priority Data

Dec. 15, 2015   (DE) .......... 10 2015 225 220

(51) Int. Cl.
*H04W 12/04* (2009.01)
*H04B 17/318* (2015.01)
*H04L 29/08* (2006.01)
*H04W 84/12* (2009.01)

(52) U.S. Cl.
CPC .......... *H04W 12/04* (2013.01); *H04B 17/318* (2015.01); *H04L 67/12* (2013.01); *H04W 84/12* (2013.01)

(58) Field of Classification Search
CPC ... H04M 3/00; G06F 17/30908; H04W 12/08; H04W 92/04; G06Q 10/00; H04L 67/00; H04L 63/0492; H04L 63/04; H04L 63/00; H04N 21/47; H04N 7/00; H04N 21/41; H04N 21/60; H04N 21/414; H04N 21/00; H04N 21/40; H04N 21/41407
See application file for complete search history.

(56) References Cited

U.S. PATENT DOCUMENTS

2010/0313025 A1* 12/2010 Tsouri ............ H04L 9/0891
                                                713/171
2013/0236007 A1*  9/2013 Munro ............ H04L 9/0861
                                                380/44

FOREIGN PATENT DOCUMENTS

| DE | 102012215326 | 3/2014 |
| DE | 10 2014 217320 | 3/2016 |
| DE | 10 2014 217330 | 3/2016 |
| WO | 1996023376 | 8/1996 |
| WO | 2006081122 | 8/2006 |

* cited by examiner

*Primary Examiner* — Jung Liu
(74) *Attorney, Agent, or Firm* — Norton Rose Fulbright US LLP; Gerard Messina

(57) ABSTRACT

A method is provided for generating a secret sequence of values in a first device as a function of measured physical properties of a transmission channel between the first device and at least one second device. With this method, movements are detected by at least one sensor, which have an effect on the physical properties of the transmission channel. The measurement of the physical properties of the transmission channel is carried out as a function of the detected movements.

23 Claims, 5 Drawing Sheets

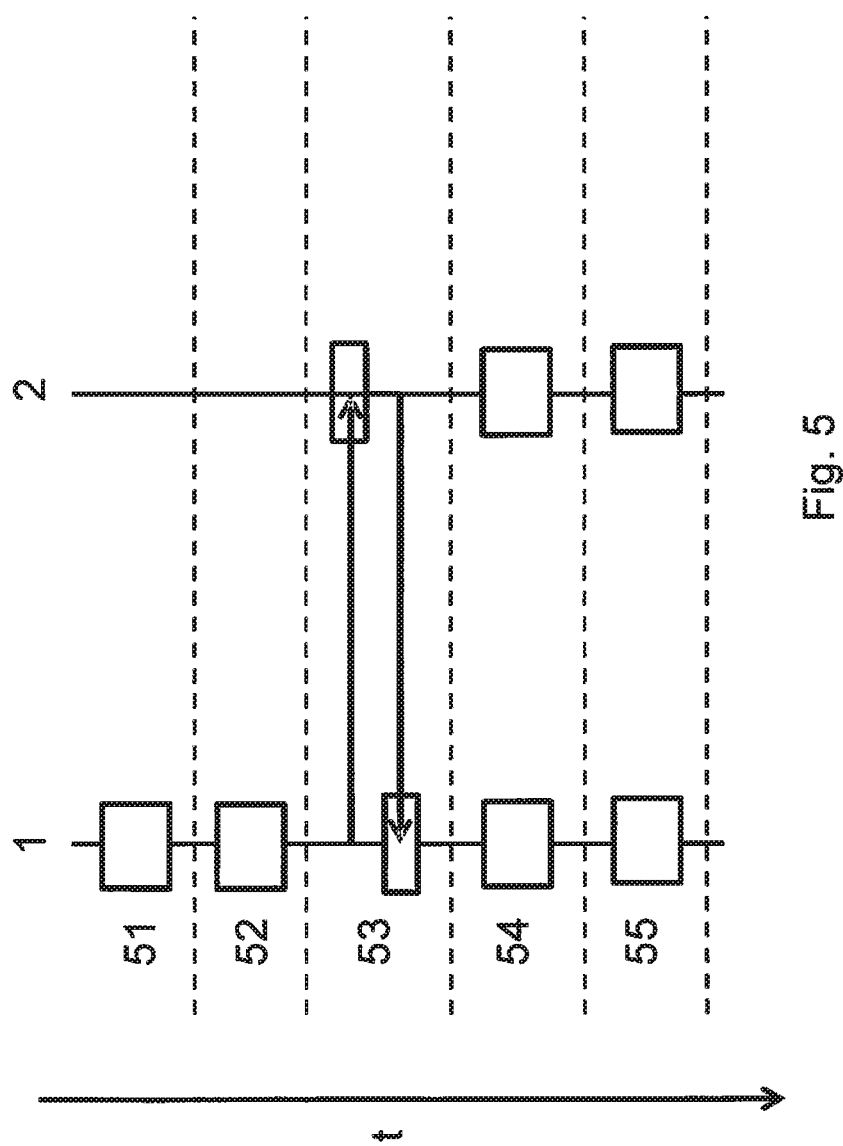

METHOD FOR GENERATING A SECRET SEQUENCE OF VALUES IN A DEVICE AS A FUNCTION OF MEASURED PHYSICAL PROPERTIES OF A TRANSMISSION CHANNEL

FIELD OF THE INVENTION

The present invention relates to methods for generating a secret sequence of values in a device as a function of measured physical properties of a transmission channel, as well as computer programs and devices, which are configured to carry out such methods.

BACKGROUND INFORMATION

To secure communication in networks, suitable cryptographic methods are normally used, which may be subdivided into two different categories: symmetrical methods, in which the sender and the recipient have the same cryptographic key, and asymmetrical methods, in which the sender encrypts the data to be transmitted with a public (i.e., possibly also known to a potential attacker) key of the recipient, but in which the decryption may only be carried out with an associated private key, which is known ideally only to the legitimate recipient.

Asymmetrical methods have, among others, the disadvantage that they generally exhibit a very high computing complexity. Hence, they are only conditionally suited for resource-limited nodes such as, for example, sensors, actuators and the like, which normally have only a relatively small computing capacity and a small memory and are said to operate energy efficiently, for example, based on battery operation or on the use of energy harvesting. Moreover, frequently only a limited bandwidth is available for data transmission, which makes the exchange of asymmetrical keys having lengths of 2048 bits or even more unattractive.

In symmetrical methods, however, it must be ensured that both the recipient and the sender have the same key. The associated key management in this case generally represents a very challenging task. In the field of mobile communications, keys are inserted into a mobile phone, for example, with the aid of SIM cards and the associated network may then assign the unique identifier of a SIM card to the corresponding key. In the case of wireless LANs however, the keys to be used ("pre-shared keys" normally defined by the input of a password) are normally input when the network is established. However, such a key management rapidly becomes very costly and impracticable when there are a large number of nodes, for example, in a sensor network or other machine-to-machine communication systems. In addition, changing the keys to be used is often not possible at all, or possible only at great cost.

Thus, for some time now, novel approaches under the keyword "Physical Layer Security" have been studied and developed, with the aid of which keys for symmetrical methods may be generated automatically on the basis of the transmission channels between the nodes involved. The ascertainment of random numbers or pseudo-random numbers from channel parameters is derived, for example, from PCT Published Patent Application No. WO 1996023376 A2; the generation of secret keys from channel parameters is described, for example in PCT Published Patent Application No. WO 2006081122 A2 or German Published Patent Application No. 102012215326 A1.

Typically, the initial bit sequences derived from the transmission channel characteristics in the devices involved are (strongly) correlated, but not identical. Since, however, symmetrical cryptography requires identical keys, a key harmonization process is necessary. In such a case, information about the quantized bit sequences may be exchanged and reconciled, in which case preferably little about the sequences and the keys to be derived therefrom is to be revealed to potential attackers, who could monitor the communication exchange. Two such approaches are the use of a CASCADE protocol or the use of error correction methods (error correction codes). However, they also reveal the redundancy information exchanged in the process, which makes it easier for an attacker to obtain access to parts of the secret key. This reduces the entropy and, therefore, the security of the key. Thus, for example, a potential attacker has to try out a smaller number of combinations for a brute-force attack.

According to various predictions, the much-described Internet of Things (IoT) will already include many billions of devices linked to one another in just a few years. In several areas such as, for example, home automation (Smart Home), a large portion of these devices will be battery-operated, for example, as radio-based sensors and actuators, which are connected to a central base station or to other radio-based devices. For such devices in particular, but also for other users in the Internet of Things, an energy-efficient implementation is important. To date, however, the energy efficiency in the implementation of cryptographic methods for securing the communication of such devices has received little attention.

Whereas methods of the "physical layer security" or physics-based key generation methods have previously been studied, these studies focus largely on the underlying telecommunications technology or on questions of information theory. Here as well, energy-efficient implementations have barely been examined to date. Exceptions to this are, for example, German Published Patent Application No. 10 2014 217320 A1 and German Published Patent Application No. 10 2014 217330 A1, in which energy-saving securing methods for networks based on methods of the physical layer security are described.

SUMMARY

The present invention relates to methods as well as to devices, which are configured to carry out one of the methods. The present invention also relates to a computer program, which is configured to carry out one of the methods.

The basis for this are two devices, which are connected to one another and are able to exchange data. Values may be derived in the devices from properties of the (in particular, wireless) transmission channel between them, and a bit sequence ascertained therefrom. As a shared secret, this bit sequence may, in particular, be the basis of a key for an encrypted communication between the devices.

It is now provided to detect movements with the aid of sensors and to adapt the measurement of channel properties of the transmission channel taken for generating the secret bit sequence as a function of the detected movements. Movements which may have an effect on the channel properties, are taken into consideration. These are preferably movements of the involved devices themselves or movements in their surroundings. Movements may be classified by evaluating the sensor data and, based on the evaluation, an estimation of the fluctuations in the channel properties may be made. Thus, it is possible to adapt measured parameters to the expected channel properties and to therefore carry out precise and efficient measurements. In the preferred exemplary embodiment, a sampling rate is adjusted as a function of the channel fluctuations expected due to the detected movements. Sampling or sampling rates are understood here and in the following to mean, in particular, channel estimations/channel measurements, or the number of channel estimations/channel measurements over time. Thus, the sampling rate may also be referred to as channel estimation rate.

In the case of high fluctuations in the channel property to be measured, a higher sampling rate of the measurement may be selected; in the case of lower fluctuations, a lower sampling rate of the measurement may be selected. Thus, an energy-wasting oversampling need not occur, but the entropy of the channel properties may nevertheless be largely optimally utilized. With measured parameters, efficient because they are adapted, the number of measurements and the total time until a secret bit sequence or sequence of values is generated, may be reduced.

The methods provided for sensor-based channel estimation may be implemented, without having to introduce additional communication complexity or to invest additional synchronization effort.

BRIEF DESCRIPTION OF THE DRAWINGS

FIG. 5 shows the sequence of an exemplary method for deriving a shared secret between two network users.

DETAILED DESCRIPTION

Figure 1:
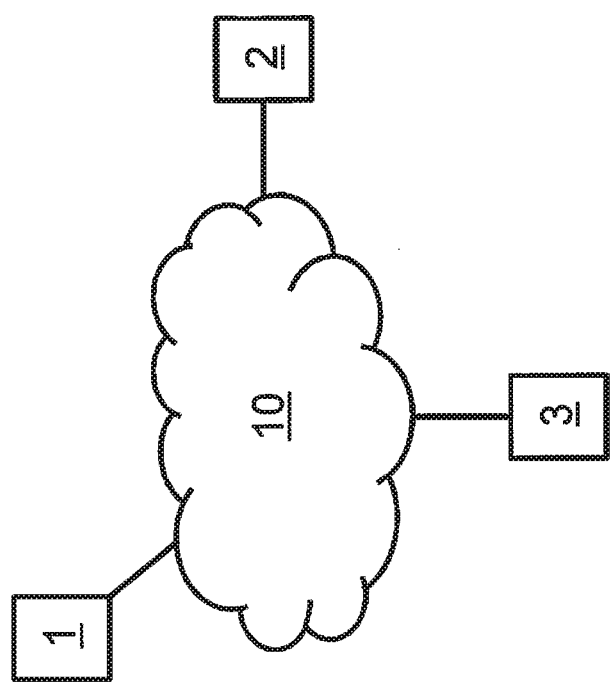
FIG. 1 schematically shows the structure of an exemplary, underlying communication system.

In the following, a configuration is considered as it is abstractly depicted in FIG. 1. In this configuration, various users 1, 2 and 3 may communicate with one another via a so-called shared transmission medium ("shared medium") 10. Users 1, 2 and 3 are typical devices having communication means, which are situated as communication nodes in a communication network such as, for example, a wireless network (Wireless Sensor Network WSN, Wireless Body Area Network WBAN, etc.).

Figure 2:
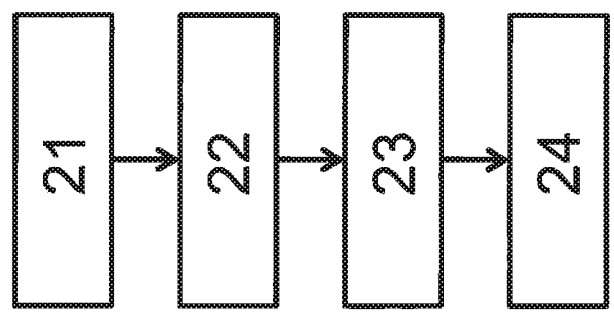
FIG. 2 shows the sequence of an exemplary method for deriving a shared secret between two network users.

At least two of the users now intend to extract a shared secret from properties of a shared (in particular, wireless) communication channel using the methods of the so-called physical layer-based key generation. One exemplary sequence of such a method is schematically depicted in FIG. 2. The method in this case includes the four blocks of the channel measurement (channel measurement, step 21), the quantization (quantization, step 22) the information reconciliation (information reconciliation, step 23) and the privacy amplification (privacy amplification, step 24). Variants may be supplemented by additional optional blocks of the signal processing and additional calculation steps.

The methods considered are suitable for automatically generating shared secrets, in particular, symmetrical, cryptographic keys based on properties of physical channels between devices having a wireless or wired communication link, for example, between users of a network. Thus, it is possible without extensive effort to use symmetrical encryption methods for implementing various security goals, which is of interest, in particular, for applications in the area of machine-to-machine communication, i.e., for example, for the transmission of data between various sensor nodes and/or actuator nodes.

The reciprocity and the inherent randomness of the transmission channels between the devices is utilized in the process. This may take place, in particular, as described in the following. Two devices estimate a particular number of channel parameters, potentially also over time. Possible properties of the transmission channel which may be used for this purpose include, among others, amplitude properties of the transmission, phase properties of the transmission and combinations of these. Thus, channel parameters include, for example, phase shifts caused by the transmission channel, attenuations and variables derived therefrom. The received signal strength indicator (RSSI) is, for example, a conventional indicator for the reception field strength of wireless communication applications and may be used for these purposes. To ascertain the channel parameters, known pilot signal sequences or trial data or test data may be transmitted between the nodes to both sides, which facilitate the necessary channel estimations.

In the method described, it is assumed that a potential attacker is distanced a sufficient degree from the two devices, in which the symmetrical key is to be generated. The distance in this case should be at least on the magnitude of the so-called coherence distance or of the so-called coherence space which, for example, is in the range of a few centimeters in the conventional wireless communication systems. The attacker therefore sees in each case other (independent) transmission channels to these two devices and is unable to readily reconstruct the same key.

It is also assumed that the transmission channels between the nodes exhibit sufficient fluctuations of their channel properties in order to be able to derive suitable channel parameters therefrom, which are suitable as a basis for a key generation in the users, in particular, exhibit sufficient random properties. These fluctuations in this case may occur, in particular, both in the time domain as well as in the frequency domain and, in the case of multi-antenna systems, also in the spatial domain. It is also assumed, however, that the channel properties exhibit a sufficiently high correlation over short time periods, so that data transmissions may take place in both directions, from which the respective nodes are able to estimate sufficiently identical channel properties despite the time offset, in order to obtain sufficiently similar channel parameters, from which identical keys may be obtained.

The ascertained channel parameters are suitably quantized by both devices. This is then preferably followed by measures for noise reduction or error reduction, for example, by using error correcting codes. The quantized channel parameters between the devices are then reconciled with the aid of suitable mechanisms (also called key alignment or information reconciliation), preferably using a public protocol. This is necessary in many applications, since initially the two devices in general have not ascertained identical parameter sets due to measuring inaccuracies, noise, interferences, etc. The reconciliation in this case should be devised in such a way that a potential attacker, who is able to monitor the exchanged data, is unable to readily deduce therefrom the quantized channel parameters. For this purpose, parity bits, for example, could be exchanged between the devices.

Finally, calculations may also be provided in the devices, which increase the privacy of the derived secret (privacy amplification).

Since the communication channel or transmission channel between the devices is used in the described methods as a random source, a suitable sampling and measuring of the channel properties are crucial for being able to obtain secrets or keys of high quality and low predictability. It is difficult, however, to implement an optimal channel sampling rate, particularly in conditions with rapidly changing signal propagation. This is due to the fact, among others, that the changes of the channel properties are known only when an estimation has already been made by the recipient of a communication over the communication channel. At this point in time, however, the channel sampling has already occurred.

Thus, in order to optimally utilize the contained entropy of a channel, a continuous oversampling would be necessary in order to have a perfect knowledge of the channel, even in the case of strongly varying channel properties.

Such an oversampling would, however, correspond to a very high-frequency sampling rate and, thus, to an inefficient generation of secrets or keys, in particular, because communication contributes comparatively heavily to the total energy consumption of such methods. The energy consumption for communication in such case may exceed the consumption for required calculations many times over. Thus, the energy consumption of a continuous oversampling is critical, in particular, for small battery-operated devices such as sensors. If, however, a (preset) lower sampling rate is selected, then knowledge about the channel properties diminishes and the expected overall time increases until measurements of sufficient entropy for generating secrets of the desired length are concluded. This time lag, in turn, results in higher energy consumption and, in addition, to long wait times until a secret or key is successfully generated.

It is therefore provided to add sensor data as supporting information to the described methods for generating a secret. Suitable sensors such as, for example, acceleration sensors, gyroscopes or magnetometers are to be used in such case in order to detect movements, which affect the channel properties to be measured. The instantaneous movement scenario is to be classified on the basis of the detected movements. The type and speed of the movement are preferably detected. With that, the device or devices may then estimate the instantaneous channel statistics or predict the upcoming channel statistics. As a result, the channel sampling rate and, if necessary, other parameters of the channel measurement, may be adapted to the instantaneous conditions and requirements. Thus, a shared secret or key may be generated more energy-efficiently with the methods described.

Figure 3:
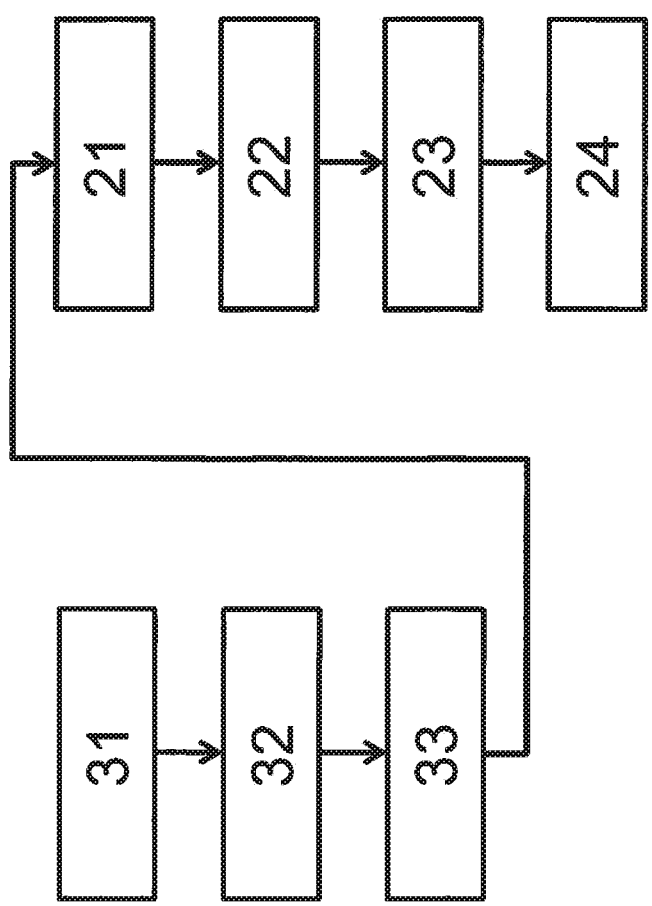
FIG. 3 shows a supplemented sequence of an exemplary method for deriving a shared secret between two network users.

Accordingly, in FIG. 3, the blocks of the method according to FIG. 2 have been augmented by three preceding blocks. In the first step 31, the sensor data are detected via movements, which may influence the channel properties to be measured. In step 32, an evaluation of the sensor data takes place, for example, including a classification of the detected movements. Finally, in step 33, parameters of the channel measurements are adapted, in particular, a sampling rate. The sampling rate in this case may be repeatedly dynamically adapted during the entire method, at least as long as measurements are pending.

Figure 4:
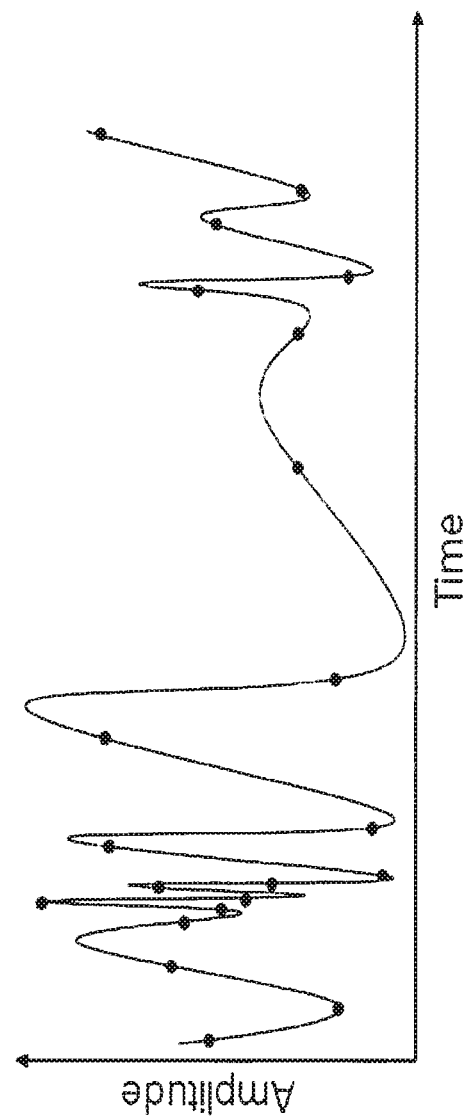
FIG. 4 shows the temporally fluctuating amplitude of a connection intensity between two network users as a physical channel property, and sampling points corresponding to a variable sampling rate of measurements of the amplitude.

In FIG. 4, an amplitude corresponding to a connection intensity is plotted over time as an exemplary channel property. As the result of an adapted sampling rate, the plotted sampling points of a measurement of the channel amplitude are adapted to the variations or fluctuations of the amplitude: the sampling rate of the measurement increases with increasing fluctuations in the measured channel property. During only very slowly varying channel properties, the sampling rate in this case may be reduced to a minimal sampling rate. This minimal sampling rate may be selected, for example, as a Nyquist rate. In this rate, the clock frequency of a point-by-point sampling from the original signal is selected to be twice that of the highest frequency contained in the original signal. A maximum sampling rate may also be preconfigured up to a point at which an increase in the case of strong fluctuations of the channel properties (or in the case strongly detected movements) may occur.

Detected and evaluated movements include, in particular movements of one or both of the two involved devices. However, additional movements in the surroundings of one or of both devices or in the vicinity of the shared communication channel or transmission path may also be relevant for the channel properties and may therefore also be detected. The corresponding sensors may preferably be integrated into one or both of the involved devices or may be connected to the devices.

In one preferred embodiment, only one of the two devices 1 has such a sensor. The exemplary sequence of a corresponding method is shown in FIG. 5 as a temporal sequence for user devices 1 and 2.

In a step 51, user 1 utilizes its corresponding sensor and detects movements, in particular, movements of user devices 1 and 2. These may be respective movements of devices 1 and 2 or also a relative movement between the users. The sensor data are evaluated accordingly in step 52, in particular, a classification of the instantaneous movement scenario may be made. In addition, at least one parameter of the measurement, in particular, a sampling rate of the measurement, is selected in step 52 as a function of the detected movements. User 1, taking the selected parameter into consideration, sends a test signal or trial signal in step 53, so that user 2 may sample or measure the channel properties according to the parameter. Once user 2 has received the test signal or trial signal from user 1, it also sends a test signal or trial signal to user 1, so that this user may also sample or measure the channel properties. Steps 51 through 53 are preferably carried out repeatedly in a loop. Once sufficient channel measurements have been carried out, the collected data sets are passed on to step 54.

In steps 54 and 55, the calculations described for quantification and for information reconciliation and the generation of the secret or key are also carried out.

The underlying concept is that movement, primarily of the participating devices themselves, increases the variance and (as a function of the speed of movement) the rate of change of the channel properties of a multi-path propagation. The detection of sensor data enables a device to be able to estimate the instantaneous movement scenario and to predict the corresponding channel statistics, without the device having precise knowledge of the channel properties.

Thus, the detection of variable movements in this case aids in dynamically adapting the channel sampling rate to the instantaneous rate of modification of the channel properties. Thus, a continuous oversampling may be dispensed with and energy may be saved. The channel sampling rate may be increased accordingly in order to be able to detect the maximum entropy in the case of strongly fluctuating channel properties. For such cases, it is possible, therefore, to minimize the total duration of a secret or key generation and, thus, to shorten the wait time until a communication on the basis of the secret is secured.

A parameter of the measurements, which may be selected as a function of the detected movements, may also include a time period for the measurements or a starting point in time for the measurement. Thus, for example, the corresponding test signals or trial signals between the users may be sent specifically at points in time with the desired (in particular, sufficiently strong) fluctuation of the channel properties and thus the measurements may occur at the desired times.

The methods described herein for generating symmetrical keys for securing the communication between two devices may be used in a variety of wireless, wired and other communication systems. The approach described is of particular interest for machine-to-machine communication, i.e., for the transmission of data between various sensors, actuators, etc., which, in general, have only very limited resources and, possibly are unable to be manually configured in the field with reasonable effort. Applications include, for example, home automation and building automation, telemedicine, car-to-x systems or industrial automation. Of particular interest in this regard is also the use in future micro-sensors having radio interfaces.

What is claimed is:

1. A method comprising:
    detecting, by at least one sensor, at least one movement that has an effect on a physical property of a transmission channel between a first device and a second device, wherein the at least one movement is a movement of at least one of the first device, the second device, an environment of the first device, and an environment of the second device;
    based on the detected movement, selecting, by a processor, a temporary sampling rate;
    generating, by the processor, a transmission between the first and second devices over the transmission channel;
    sampling, by the processor, a signal of the transmission channel at the selected temporary sampling rate to obtain a plurality of signal samples;
    analyzing, by the processor, a combination of the plurality of signal samples obtained by the sampling of the signal at the selected temporary sampling rate to obtain a measurement of the physical property of the transmission channel; and
    generating, by the processor, an encryption key as a function of the measurement of the physical property.

2. The method as recited in claim 1, wherein the movement is of at least one of the first device and the second device.

3. The method as recited in claim 1, wherein the at least one movement includes a movement of the first device relative to the second device.

4. The method as recited in claim 1, wherein the at least one includes movements of objects in surroundings of the first device, of the second device, or of the transmission channel between the first device and the second device.

5. The method as recited in claim 1, wherein the measurement is carried out as a function of a strength of the movement.

6. The method as recited in claim 1, wherein the selection of the temporary sampling rate is selected so that the greater the detected movement, the greater the selected temporary sampling rate.

7. The method as recited in claim 6, wherein the selection of the temporary sampling rate is performed according to a condition that the sampling rate cannot be greater than a predefined maximum sampling rate.

8. The method as recited in claim 6, wherein the sampling rate is increased in accordance with an expectation, based on the at least one movement, of one of a higher fluctuation and a higher variance in the physical property.

9. The method as recited in claim 1 wherein the sampling is selected so that the greater is one of a speed, acceleration, and a frequency of the detected movement, the greater the selected temporary sampling rate.

10. The method as recited in claim 6, wherein the selection of the temporary sampling rate is performed according to a condition that the sampling rate cannot be lower than a predefined minimum sampling rate.

11. The method as recited in claim 10, wherein the minimum sampling rate corresponds to a Nyquist rate.

12. The method as recited in claim 1, wherein the generated transmission is of a test signal.

13. The method as recited in claim 12, wherein the test signal is adapted by the first device serving as a transmitting device transmitting the test signal in such a way that the selected sampling rate for the second device serving as a receiving device results.

14. The method as recited in claim 1, further comprising:
    determining a suitable time period for the measuring as a function of the detected movement.

15. The method as recited in claim 1, wherein the at least one sensor is one of an acceleration sensor, a gyroscope, and a magnetometer.

16. The method as recited in claim 1, wherein the at least one sensor is mounted one of:
    one of in and on the first device, and
    one of in and on the second device.

17. The method as recited in claim 1, wherein the selection of the temporary sampling rate is carried out as a function of at least one of a speed, an acceleration, a direction, and a frequency of the movement.

18. The method as recited in claim 14, wherein the suitable time period includes a starting point in time for the measuring.

19. The method as recited in claim 1, wherein the encryption key is one of a plurality of encryption keys that are each generated based on respective measurements of the physical property obtained by respective analyses of respective combinations of signal samples obtained at different respective temporary sampling rates due to different detected movements on the basis of which the different respective temporary sampling rates are selected.

20. The method as recited in claim 1, wherein different ones of the signal samples forming the plurality of signal samples whose combination is analyzed for generating the encryption key are sampled using different temporary sampling rates selected based on different movements detected during a period in which the plurality of signal samples are obtained.

21. A device comprising:
    a sensor configured to detect at least one movement that has an effect on a physical property of a transmission channel between a first device and a second device, wherein the at least one movement is a movement of at least one of the first device, the second device, an environment of the first device, and an environment of the second device; and
    a processor, wherein the processor is configured to:
        based on the detected movement, select a temporary sampling rate;
        generate a transmission between the first and second devices over the transmission channel;
        sample a signal of the transmission channel at the selected temporary sampling rate to obtain a plurality of signal samples;

analyze a combination of the plurality of signal samples obtained by the sampling of the signal at the selected temporary sampling rate to obtain a measurement of the physical property of the transmission channel; and generate an encryption key as a function of the measurement of the physical property.

22. A non-transitory machine-readable memory medium on which a computer program is stored containing program code that is executable by a processor and that, when executed by the processor, causes the processor to perform a method, the method comprising:

determining, based on output of at least one sensor, at least one movement that has an effect on a physical property of a transmission channel between a first device and a second device, wherein the at least one movement is a movement of at least one of the first device, the second device, an environment of the first device, and an environment of the second device;

based on the detected movement, selecting a temporary sampling rate;

generating a transmission between the first and second devices over the transmission channel;

sampling a signal of the transmission channel at the selected temporary sampling rate to obtain a plurality of signal samples;

analyzing a combination of the plurality of signal samples obtained by the sampling of the signal at the selected temporary sampling rate to obtain a measurement of athe physical property of the transmission channel; and generating an encryption key as a function of the measurement of the physical property.

23. A method comprising:

detecting, by at least one sensor of a first device, at least one movement that has an effect on a physical property of a transmission channel between the first device and a second device, wherein the at least one movement is a movement of at least one of the first device, the second device, an environment of the first device, and an environment of the second device;

based on the detected movement, selecting, by a processor of the first device, a temporary sampling rate;

generating, by the processor, transmissions at the selected sampling rate and from the first to the second device over the transmission channel;

sampling, by the processor, respective signals of transmissions returned by the second device to the first device over the transmission channel in response to the generated transmissions;

analyzing, by the processor, a combination of the plurality of signal samples obtained by the sampling to obtain a measurement of the physical property of the transmission channel; and generating, by the processor, an encryption key as a function of the measurement of the physical property.

* * * * *